(12) United States Patent
Diamantidis

(10) Patent No.: US 7,675,677 B2
(45) Date of Patent: *Mar. 9, 2010

(54) BINOCULARS

(75) Inventor: Georg Diamantidis, Dernbach (DE)

(73) Assignee: Noctron Holding S.A., Luxembourg (LU)

( * ) Notice: Subject to any disclaimer, the term of this patent is extended or adjusted under 35 U.S.C. 154(b) by 458 days.

This patent is subject to a terminal disclaimer.

(21) Appl. No.: 11/415,408

(22) Filed: May 1, 2006

(65) Prior Publication Data

US 2006/0245051 A1  Nov. 2, 2006

(30) Foreign Application Priority Data

May 2, 2005  (DE) .................. 10 2005 020 860

(51) Int. Cl.
G02B 23/00 (2006.01)
F21V 9/06 (2006.01)

(52) U.S. Cl. .................. 359/407; 359/361; 359/590; 359/891

(58) Field of Classification Search ......... 359/350–361, 359/407–420, 480–482, 577–590, 885–888
See application file for complete search history.

(56) References Cited

U.S. PATENT DOCUMENTS

| | | | | | |
|---|---|---|---|---|---|
| 2,124,157 | A | * | 7/1938 | Trautmann | 359/418 |
| 2,280,354 | A | * | 4/1942 | Rezos | 359/408 |
| 2,986,969 | A | * | 6/1961 | Muncheryan | 359/478 |
| 4,733,958 | A | * | 3/1988 | Gorsich | 351/158 |
| 5,270,854 | A | * | 12/1993 | Lee et al. | 359/359 |
| 5,521,759 | A | * | 5/1996 | Dobrowolski et al. | 359/585 |
| 6,726,320 | B1 | * | 4/2004 | Mullin et al. | 351/44 |
| 2005/0180724 | A1 | * | 8/2005 | Diamantidis | 385/147 |

FOREIGN PATENT DOCUMENTS

DE  3909434  3/1993

* cited by examiner

*Primary Examiner*—Thong Nguyen
(74) *Attorney, Agent, or Firm*—Factor & Lake, Ltd.

(57) ABSTRACT

A pair of binoculars has lenses constituting optical filters with a transmissivity range within the wavelength range between about 650 nm and at least 800 nm and also with an additional transmissivity band within a wavelength range from about 310 nm to about 600 nm. The objects viewed with such a pair of binoculars appear as an image that is carried by a satin-finished metallic surface.

9 Claims, 3 Drawing Sheets

BINOCULARS

CROSS-REFERENCE TO RELATED APPLICATIONS

This application claims priority of German Patent Application DE 10 2005 020 860.6, filed May 2, 2005. The full disclosure of this application is incorporated herein by reference.

BACKGROUND OF THE INVENTION

1. Field of the Invention

The present invention relates to binoculars.

2. Descripton of the Related Art

Chromatic filters are known to be used in optical instruments in order to improve the perceptibility of certain objects.

A filter that is described in DE 39 09 434 C2 exhibits, besides a transmissivity range situated within the red wavelength region, an additional transmissivity band within a wavelength range between 400 nm and 525 nm which has its maximum at 470 nm. At shorter wavelengths in comparison with the wavelengths of chlorophyll fluorescence this additional transmissivity band performs two functions: on the one hand, it serves to make the surroundings—that is to say, objects and living organisms that do not contain chlorophyll—appear to the observer in colours that are as natural as possible; on the other hand, the additional transmissivity band takes account of the physiological peculiarity of the human eye of being able, in a dark environment, to be brought by light radiation within a shorter wavelength range into a state of higher sensitivity which is effective in respect of the entire wavelength region of visible light—that is to say, also in respect of red light.

SUMMARY OF THE INVENTION

Surprisingly it has now been discovered that when filters of such a type are used as lenses or filter discs of a pair of binoculars, images are generated in the eye that appear as if they were carried by a matt satin-finished metallic surface. In this way, aesthetic effects are obtained that would otherwise be achievable only with high production costs.

If the tinted optical element is a lens, this has the advantage that the same casings can be used for binoculars according to the invention as for a conventional pair of binoculars. Said optical element can consequently be constructed economically, even in small production quantities. The costs of assembly are also unchanged, and the same—possibly automated—assembly devices can be used as for normal binoculars.

It is advantageous if the additional transmissivity band exhibits a half-value width from 10 nm to 20 nm. By virtue of a narrow transmissivity width, the radiation within the wavelength region of green light impinging on the human eye is greatly restricted to wavelengths to which the eye reacts sensitively.

If the additional transmissivity band extends to the range from about 530 nm to about 560 nm, the wavelength range by which the human eye is brought to a state of higher sensitivity is captured approximately optimally.

If the additional transmissivity band also encompasses a wavelength range between about 360 nm and about 430 nm, radiation with a blue content passes through the tinted optical element, as a result of which these objects can be distinguished well from objects emitting red light.

It is advantageous if the two sub-bands of the additional transmissivity band have a half-value width from about 10 nm to about 20 nm. In this way, a passage of light that is not necessary for achieving the desired effect can be prevented.

The two sub-bands are preferably only about 15 nm wide. This results in the desired effect, given a good ratio of the intensities of red light and other light.

If the second short-wavelength sub-band ranges from 360 nm to 430 nm, the binoculars are also optimised further with regard to the distinguishability of chlorophyll-free objects and chlorophyll-containing plants.

It is particularly advantageous if the transmissions of the transmissivity range within the red wavelength region from 650 nm to at least 800 nm and of the additional transmissivity band(s) for the two tinted optical elements of the binoculars are different. By this measure, the corresponding transmissivities can be optimally matched to one another, in order to convey the impression of a high-contrast image on a satin-finished metallic surface.

The transmission of the first transmissivity range, which lies within the red wavelength region, is preferentially between about 50% and about 80%, and the transmission of the additional transmissivity band is preferentially between about 10% and about 80%.

For the two sub-bands of the additional transmissivity band the transmissions are preferably between about 25% and about 35% (short-wavelength sub-band) and between about 5% and about 10% (longer-wavelength sub-band).

With these ratios of the transmissions, the two desired effects—the sensitisation of the human eye and the rendering as though on a satin-finished metallic surface—are taken into account.

DESCRIPTION OF THE DRAWINGS

Exemplary embodiments of the invention will be described in more detail below on the basis of the drawing. Shown in this drawing are.

DESCRIPTION OF THE INVENTION

Figure 1:
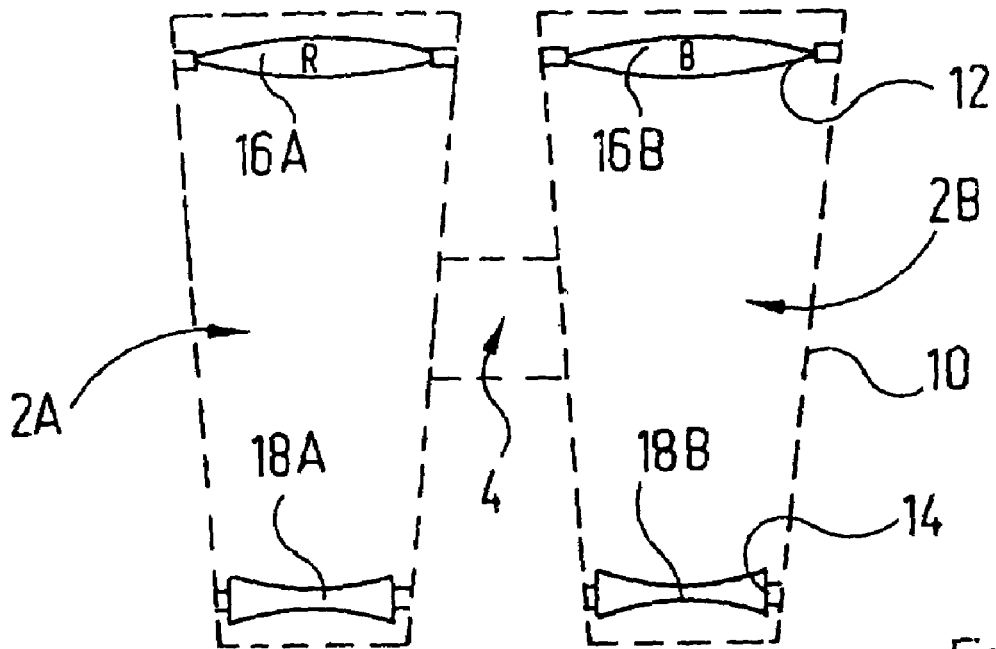
FIG. 1: schematically, a pair of binoculars that presents what is seen as if it were on a matt-finished metallic surface.

While the present invention is capable of embodiment in many different forms, there is shown in the drawings and will herein be described in detail exemplary embodiments of the invention with the understanding that the present disclosure is to be considered as an exemplification of the principles of the invention and is not intended to limit the broad aspect of the invention to the embodiments illustrated. Like parts used in the various embodiments disclosed may use the same reference numbers unless otherwise stated.

FIG. 1 shows schematically a pair of binoculars which exhibits two articulated monoculars 2A, 2B. The articular bridge is indicated schematically at 4.

Where in the following it is not a question of the distinction between the monoculars 2A and 2B, the reference symbol 2 will simply be used. The same applies to components of the monoculars 2 that are provided symmetrically.

Each monocular 2 has a casing 10 which exhibits two lens-holders 12, 14, into which two lenses 16, 18 (objective (biconvex) and eyepiece (biconcave)) are inserted. The objective and the eyepiece may also be constituted by lens clusters, as known as such.

One of the lenses 16 and 18 is, in each instance, tinted red-violet or blue-violet, as indicated by the inscriptions R and B, respectively. For the lenses of the monocular 2A and of the monocular 2B, use may optionally be made of lenses of the same type, or of lenses that are tinted differently.

In the exemplary embodiment according to FIG. 1, the lens 16A is tinted red-violet, and the lens 16B is tinted blue-violet. The lenses 18 are achromatic.

If images or objects are viewed with such a pair of binoculars, the user of the binoculars obtains an image that looks as if it were carried by a satin-finished metallic surface.

Figure 2:
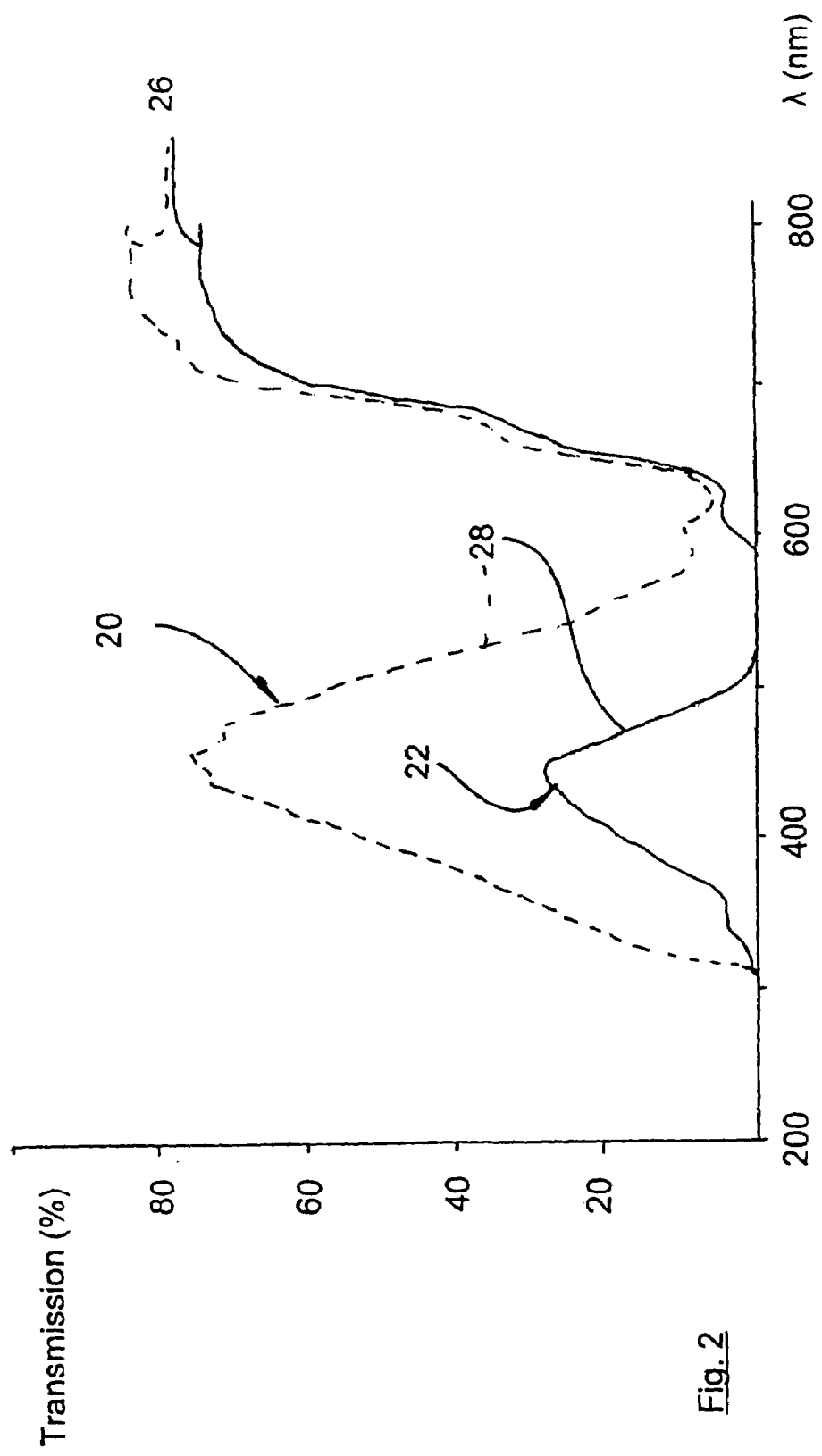
FIG. 2: the spectral transmission of two lenses of the binoculars shown in FIG. 1.
Figure 3:
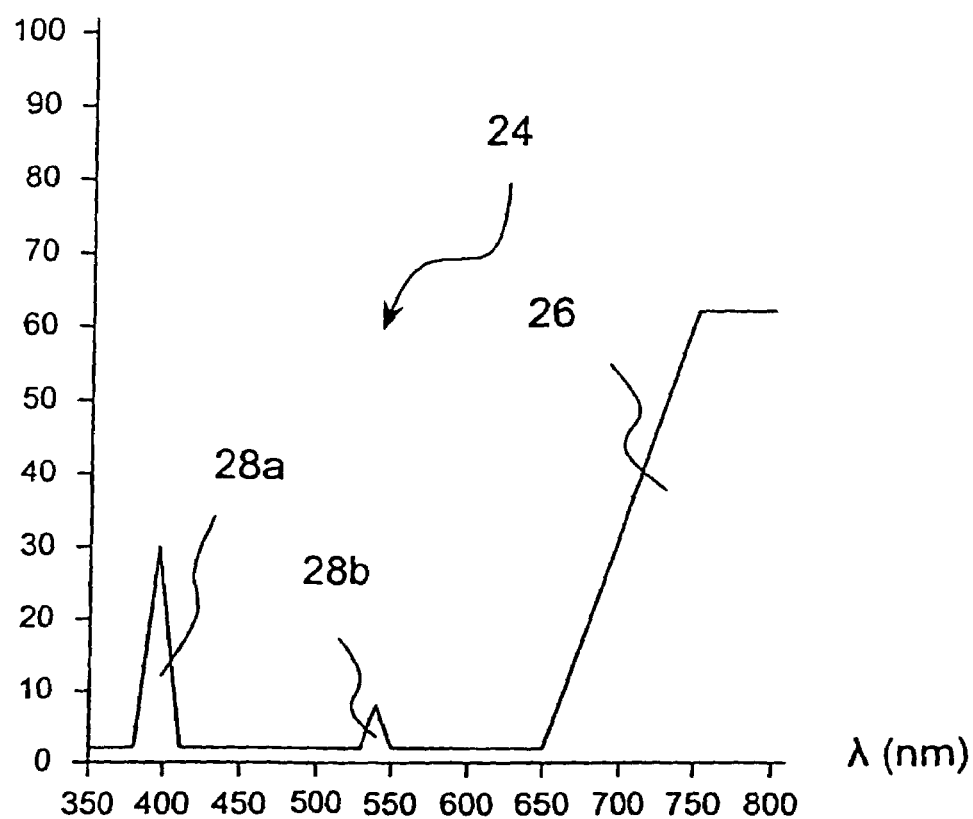
FIG. 3: the spectral transmission of a modified glass lens for the binoculars shown in FIG. 1.

The colours specified above—red-violet and blue-violet—will be elucidated in more detail on the basis of transmission spectra 20, 22, 24 of preferred lenses, which are shown in FIGS. 2 and 3.

The tinted lenses have in common the fact that in the red they exhibit a high transmissivity from over 60% to about 80%. With the lenses being considered here, this transmissivity range 26 extends at least over the wavelength range within which the fluorescence of chlorophyll is ordinarily observed (about 650 nm to at least 800 nm).

Furthermore, they have in common the fact that they additionally exhibit a transmissivity band 28 in the blue. Depending upon whether this additional band is comparably high or distinctly lower in comparison with the transmissivity range 26, the lenses appear to be blue-violet or red-violet, respectively.

For instance, in FIG. 2 the spectrum of a blue-violet glass lens is shown at 20. In this Figure the maximal transmissivity in the blue and the maximal transmissivity in the red are about the same. The transmissivity range 26 in the red extends, like a cut-off filter, over a wide range from 650 nm to 800 nm and beyond. The transmissivity in the blue has the form of a bell-shaped band 28, the centre of which is situated at around 450 nm, and the half-value width of which amounts to about 160 nm.

The spectrum of a red-violet glass lens is shown at 22. Its maximal transmissivity in the blue amounts to about 40% of the maximal transmissivity in the red. The latter is somewhat less than that in spectrum 20. The bell-shaped band 28 in the blue has its centre at about 430 nm and has a half-value width of about 100 nm.

FIG. 3 shows schematically the transmission spectrum 24 of another red-violet glass lens.

This spectrum has a red transmissivity range 26 with a transmittance of 62% within the wavelength range between 650 nm and at least 800 nm.

Besides the transmissivity range 26, a first sub-band 28a of an additional transmissivity band 28 with a maximal transmission of 30% ranges from about 380 nm to about 410 nm. A second sub-band 28b of the additional transmissivity band 28 has a transmission maximum of 8% and ranges from about 530 nm to about 550 nm.

The sub-band 28b serves to take advantage of a physiological peculiarity of the human eye. The human eye exhibits a high sensitivity within the spectral region of green visible light. If, besides light with a wavelength within the long-wavelength region, a fraction of light having a wavelength within the region of green visible light additionally impinges on the human eye, the sensitivity thereof is generally greatly enhanced, and the red radiation is perceived considerably better.

In this connection, the green radiation impinging on the human eye should not be too intense, since otherwise an overreaction of the eye may occur.

By virtue of the purposeful arrangement of the sub-band 28b within the range from 530 nm to 550 nm with a relatively low transmissivity, the aforementioned sensitivity of the human eye to green is utilised.

As stated above, the binoculars may optionally be provided with lenses that have the same filter function or a different filter function. By virtue of the transmissivity range 26 situated in the red and the additional transmissivity band 28, an image of an object in the human eye is obtained overall that conveys the impression of an image carried by a finely matt-finished or satin-finished metallic surface.

The transmissivity band 28 further fulfils the purpose of obtaining a certain colour sensation with different colours, in order in this way generally to enhance the distinguishability of objects.

The observation of a remote object with a pair of binoculars that comprises lenses having a sub-band 28b ensures that the sensitivity of the human eye in the green region is exploited for a good perception of the object without excessively straining and tiring the eye.

The glass material of the binoculars is more transmitting in respect of the red content of the radiation emitted by the object than in respect of green radiation. In the light passing through the binoculars the intensity ratio of red light to green light is therefore shifted in favour of red light.

The consequence of this is that the image of the object appears to be red-violet to the observer. With the pleasant image that appears to be red-violet and that does not strain the eyes, a rapid tiring of the eye does not occur.

In the binoculars described above, differently tinted glass material may be used for the lenses 16A and 16B and/or for the lenses 18A, 18B in order to achieve the desired colour effect.

Figure 4:
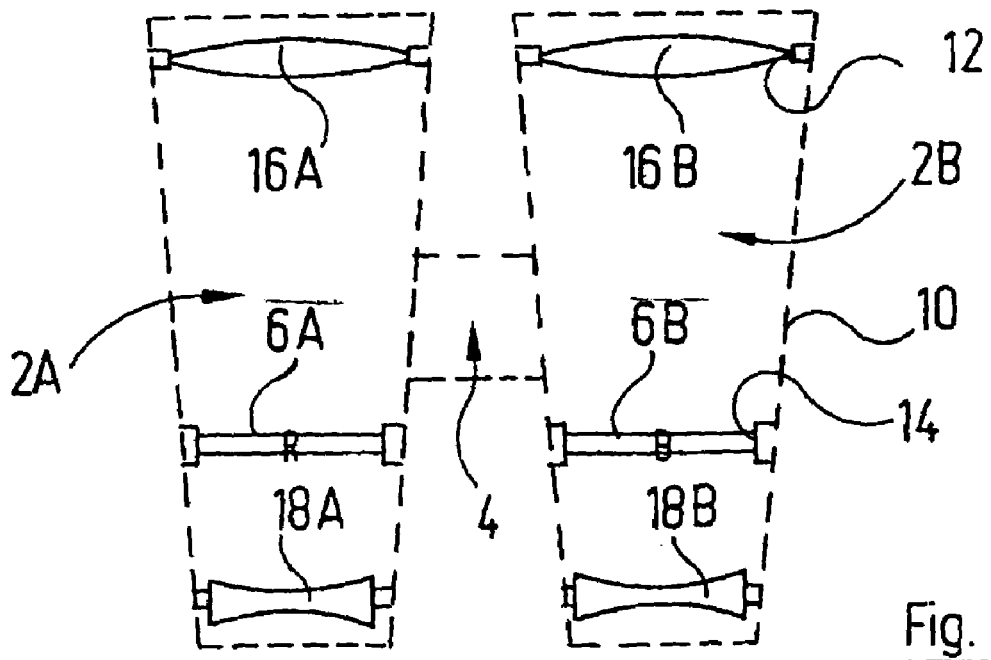
FIG. 4: a pair of binoculars constructed from pellucid lenses, which provides the same optical impression of a viewed object as the binoculars according to FIG. 1.

The exemplary embodiment according to FIG. 4 has monoculars 2 constructed from pellucid lenses 16, 18. In order to obtain the tinge of the image, described above, plane-parallel plates 6A, 6B are additionally placed in the optical path which are manufactured from types of glass such as were described above for the lenses 16A and 16B. The optical effect is the same as described above; but it is guaranteed that the intensity attenuation is precisely the same for all image regions, by reason of the plane parallelism of the plates 6, whereas the lenses 16 and 18 attenuate more strongly in their thick regions than in their thin regions. But this can be partially compensated by the varying change in thickness. e.g. inversely, of the lenses 16, 18 in the radial direction if both lenses are identically tinted.

While specific embodiments of the present invention have been illustrated and described numerous modifications come to mind without significantly departing from the spirit of the invention and the scope of protection is only limited by the scope of the accompanying claims.

The invention claimed is:

1. Binoculars exhibiting two monoculars, wherein
   a) each monocular has a casing;
   b) each casing comprises at least two holders in each of which at least one lens is inserted;
   c) at least one of the monoculars comprises a red-violet or blue-violet tinted optical element;
   d) the tinted optical element exhibits a first transmissivity range, which lies within the spectral region of chlorophyll fluorescence between about 650 nm and at least 800 nm, and at least one additional transmissivity band which lies within a shorter-wavelength region from about 310 nm to about 600 nm;

e) the additional transmissivity band exhibits a short-wavelength sub-band within a wavelength range from about 360 nm to about 430 nm and a long-wavelength sub-band within a range from about 530 nm to about 550 nm and further wherein each of the sub-bands exhibit a half-value width of about 15 nm.

2. Binoculars according to claim 1, wherein the optical element is one of the lenses of an optical path under consideration.

3. Binoculars according to claim 2, wherein the monoculars comprise lenses whose thicknesses change inversely in the radial direction, and which are identically tinted.

4. Binoculars according to claim 1, wherein the short-wavelength sub-band ranges from about 380 nm to about 410 nm and the long-wavelength sub-band ranges from about 530 nm to about 550 nm.

5. Binoculars according to claim 1, wherein the transmissions of the first transmissivity range and of the additional transmissivity band are different.

6. Binoculars according to claim 1, wherein the transmissions of the first transmissivity range amounts to between 50% and about 80% and the transmission of the additional transmissivity band amounts to between about 10% and about 80%.

7. Binoculars according to claim 6, wherein the transmission of the short-wavelength sub-band is between about 25% and about 35%, and that of the long-wavelength sub-band is between about 5% and about 10%.

8. Binoculars according to claim 6, wherein the transmission of the first transmissivity range amounts to about 62%, the transmission of the short-wavelength sub-band amounts to about 30%, and the transmission of the long-wavelength a sub-band amounts to about 8%.

9. Binoculars according to claim 1, wherein the optical element of each of the two monoculars have differing transmission in the additional transmissivity band.

* * * * *